United States Patent
Sinha

(10) Patent No.: US 7,259,478 B2
(45) Date of Patent: Aug. 21, 2007

(54) BACKUP POWER SUPPLY FOR TELEPHONE SET

(75) Inventor: Vijay K. Sinha, Laguna Niguel, CA (US)

(73) Assignee: Trigon Electronics, Inc., Corona, CA (US)

( * ) Notice: Subject to any disclaimer, the term of this patent is extended or adjusted under 35 U.S.C. 154(b) by 541 days.

(21) Appl. No.: 10/802,448

(22) Filed: Mar. 17, 2004

(65) Prior Publication Data

US 2004/0183379 A1    Sep. 23, 2004

Related U.S. Application Data

(60) Provisional application No. 60/456,093, filed on Mar. 19, 2003.

(51) Int. Cl.
*H02J 7/00* (2006.01)
(52) U.S. Cl. ........................................................ 307/66
(58) Field of Classification Search .................. 307/66, 307/80, 64
See application file for complete search history.

(56) References Cited

U.S. PATENT DOCUMENTS

| 5,133,005 A | * | 7/1992 | Kelley et al. | ................ 379/146 |
| 6,169,389 B1 | * | 1/2001 | Chen | ........................... 320/166 |
| 2003/0076642 A1 | * | 4/2003 | Shiner et al. | ............... 361/91.6 |

* cited by examiner

*Primary Examiner*—Robert L. Deberadinis
(74) *Attorney, Agent, or Firm*—Klein, O'Neill & Singh, LLP; Howard J. Klein

(57) ABSTRACT

A backup power supply for a telephone set that does not use batteries comprises a Electric Double Layer Capacitor ("EDLC") having a charge capacity sufficient to power the control electronics of the set in the event of a power failure and for the brief period of time necessary for the telephone to go off-hook and thereby draw sufficient power from the local loop of a Telco or PBX to place or receive voice calls and recharge the EDLC. The power supply includes circuitry for detecting an incoming call or an instruction to place an outgoing call during a power outage, and for responsively coupling the power of the capacitor to the electronics of the set so that the set can receive or place the call. The power supply further includes circuitry for recharging the capacitor rapidly from both the conventional power supply when it is functioning and from the local service loop when it is not.

20 Claims, 1 Drawing Sheet

BACKUP POWER SUPPLY FOR TELEPHONE SET

CROSS-REFERENCE TO RELATED APPLICATIONS

This application claims the benefit, under 35 U.S.C. Section 119(e), of co-pending Provisional Application No. 60/456,093, filed Mar. 19, 2003.

STATEMENT REGARDING FEDERALLY SPONSORED RESEARCH OR DEVELOPMENT

Not Applicable

REFERENCE TO APPENDIX

Not Applicable

BACKGROUND OF THE INVENTION

1. Field of the Invention

This invention pertains to telephones in general, and in particular, to an emergency, or backup, power supply for a telephone set that does not use batteries.

2. Description of Related Art

Conventional telephone sets, i.e., those coupling to the "tip and ring" terminals of a conventional analog "local loop" of a "Plain Old Telephone Service" ("POTS") or a PBX, typically comprise a "transmitter" (e.g., a mouthpiece or microphone), a "receiver" (e.g., a speaker or earphone), and a manually actuated "switchhook" mechanism that switches the set between an "off-hook" condition, i.e., one coupled to the local loop for signaling and communication purposes, and an "on-hook" condition, i.e., one decoupled from the local loop. The analog current-signaling technique employed in such telephones enables them to operate without need for an external power supply, since all of the electrical power needed to operate the set, 48 VDC at up to 120 mA, or 5-6 W, is supplied on the local loop by the local telephone company ("Telco") or PBX so long as the telephone set is in the off-hook condition.

However, when the set is in the on-hook condition, i.e., decoupled from the local loop, the maximum amount of power that the set can draw from the local loop is substantially limited, by FCC regulation, to 480 µW, i.e., 48 VDC at 10 µA. Accordingly, telephone sets that incorporate enhanced features, such as "hands-free" operation (i.e., "speakerphones"), dialed-number and program and data memory storage, Dual Tone Multi-Frequency ("DTMF") signaling, automatic dialing and answering, and switching control of ancillary equipments, such as video security cameras or entryway door locks, typically all require some form of an external power supply. This is because the electronics necessary to implement these additional features, such as microprocessors, dynamic memories, amplifiers, DTMF transceivers, solid-state hybrids, ring detectors, and the like, all require a moderate amount of electrical power to function, and while the power supplied by the local loop may be sufficient to power these electronics when the set is off-hook, it is inadequate to power them when the set is on-hook.

Accordingly, enhanced-function telephone sets typically incorporate a power supply in the form of an AC-DC converter that connects to the local power "mains" for operation of the set during normal operating conditions, and a battery that functions as a temporary, or backup, power supply for the set in the event of a power outage. Indeed, certain special-purpose, or "mission-critical," telephone sets, e.g., "emergency" and "access-control" telephones, which are required to at least receive or place voice calls during emergency conditions involving power outages or interruptions, are typically provided with a power supply that comprises an AC-DC converter, a rechargeable backup battery, and a battery-charging circuit that maintains a full charge on the battery during normal operating conditions.

However, backup power supplies that comprise batteries include several drawbacks that affect their long-term reliability. For example, batteries that are not rechargeable, such as alkaline or lithium batteries, must be replaced periodically if the backup power supply, and hence, the telephone set, are to function reliably in an emergency. Rechargeable batteries, such as nickel-cadmium, nickel-metal-hydride, or lithium-ion batteries, are relatively larger and more expensive than non-rechargeable batteries, incorporate materials that are hazardous to the environment, are "current-limited," and therefore require relatively sophisticated re-charging circuitry, take relatively long periods of time to recharge, and are limited in the number of times that they can be recharged before they need to be replaced.

Accordingly, a long-felt but as yet unsatisfied need exists for a backup power supply for a telephone set that is smaller, less inexpensive, safer for the environment, longer-lived, and more reliable than power supplies that rely on batteries for the storage of temporary backup power.

BRIEF SUMMARY OF THE INVENTION

In accordance with the present invention, an emergency backup or replacement power supply for a telephone set is provided that does not use batteries, and is accordingly smaller, less expensive, safer for the environment, longer-lived, and more reliable than backup power supplies that depend on batteries.

In one exemplary embodiment of the invention, the power supply comprises an Electric Double Layer Capacitor ("EDLC") having a charge capacity that, in the event of a power outage, is sufficient to power the electronics of the telephone set for the brief period of time necessary for the set to go off-hook and thereby draw sufficient power from the local service loop to place or receive one or more voice calls and to recharge the EDLC.

The novel power supply also includes circuitry for detecting either an incoming call to the set, or an instruction to place an outgoing call from the set, and in the event of an outage of the conventional power supply, for coupling the power of the capacitor to the electronics of the set so that the set can go off-hook to receive or place the call. The power supply further includes circuitry to recharge the capacitor rapidly, either from the conventional power supply when it is functioning, or if it is not, from the local service loop.

A better understanding of the above and many other features and advantages of the invention may be obtained from a consideration of the detailed description of the invention below, especially if such consideration is made in conjunction with the appended drawing.

DETAILED DESCRIPTION OF THE INVENTION

Figure 1:
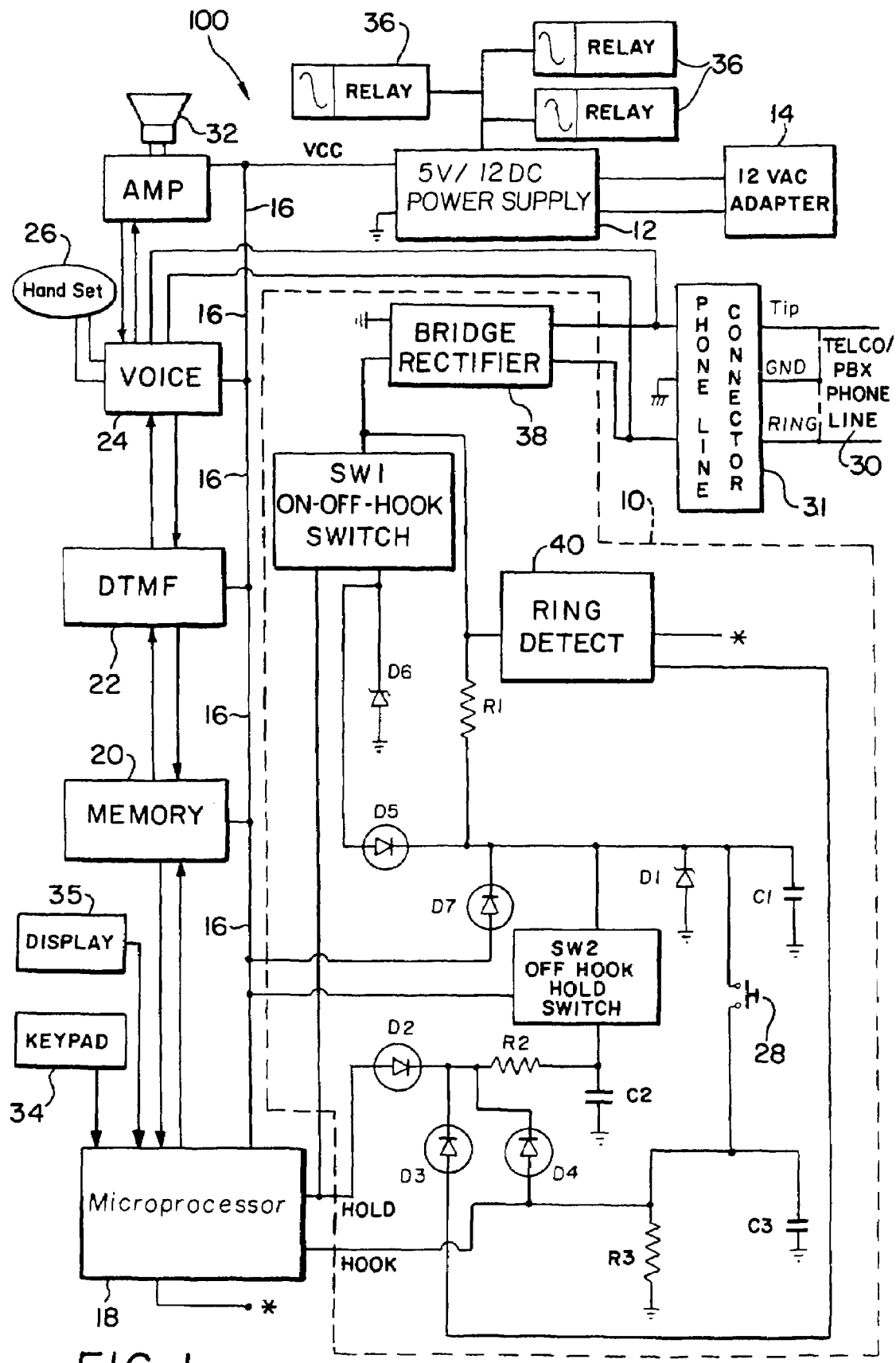
FIG. 1 is a schematic diagram of a telephone set incorporating an exemplary embodiment of a battery-less backup power supply for a telephone set in accordance with the present invention.

A telephone set 100 incorporating an exemplary embodiment of a backup power supply 10 (shown enclosed in the dashed outline) in accordance with present invention is illustrated in the schematic diagram of FIG. 1. The telephone also includes a conventional power supply 12 that couples to a local 120 VAC power source via a 12 VAC adapter 14, in a known manner. During normal operation of the telephone, the conventional power supply provides power, e.g., 5 VDC ("VCC"), via a conductive power lead, or "bus" 16, leading to the electronic components of the telephone, which typically include a programmable microprocessor integrated circuit ("IC") 18 for controlling the functions of the telephone, a memory IC 20 for storing phone numbers, program data and access/identification codes, a bidirectional DTMF transceiver 22 for converting electrical signals into audible, multi-tone signals and vice-versa, and a "voice" IC 24 that implements various telephone set functions, including that of a "hybrid," or "2-to-4-wire converter."

As illustrated in the figure, the telephone set 100 may, in one typical embodiment, include a conventional handset 26, comprising a microphone transmitter and an earphone receiver that, when lifted from the set, actuates a handset switchhook 28, thereby coupling the phone to the analog tip and ring signal inputs of the Telco or PBX local loop 30 for full duplex communication between the user of the telephone and a remote respondent.

Alternatively, in a "speakerphone" embodiment, the handset 26 may be omitted, and in its place, the telephone set 100 may include an amplified loudspeaker 32 that may also function as a microphone input to enable half- or full-duplex communication between the user and the respondent. In such an embodiment, the telephone typically incorporates at least one manually actuated pushbutton switchhook 28 that functions in the same manner as the handset switchhook 28 above, and either embodiment of telephone may also incorporate a keypad 34 for local, manual input of, e.g., phone numbers or alpha-numerical data to the set, and a display 35, e.g., a liquid crystal display, for displaying alpha-numerical data.

In addition to the above conventional communication functions, the telephone set 100 may also incorporate certain special-function elements, such as one or more control relays 36, that can be used to control a variety of ancillary devices (not illustrated), such as an entry door latch, a video camera, an alarm, or a postal lock box, in a wide variety of possible use-scenarios. For example, in one such scenario, the telephone can be mounted adjacent to the door of a locked facility. One desiring to gain entry to the facility may be required to lift the handset 26 from the set, thereby automatically initiating a telephone call from the set to a remote real or electronic "gatekeeper," who may located inside the facility, or even remotely from the site, and optionally, simultaneously actuating one of the control relays that activates a video camera adjacent to the telephone. The gatekeeper can then identify, or authenticate, the caller, both audibly, visually, and/or by receipt of a code, and if the caller is authorized to enter the facility, transmit a coded signal to the telephone that actuates another of the relays to unlock the door of the facility to the caller for a brief interval.

In another scenario, the telephone 100 can be programmed to detect the closure of one of the relays 36, e.g., an alarm relay, and to automatically dial and re-dial a pre-programmed list of different phone numbers until a respondent answers at one of the numbers on the list. In yet another scenario, the telephone can be programmed to automatically answer an incoming call from a remote telephone, and to authenticate and accept additional or different programming from the remote telephone, with or without local human participation.

It may be seen that, in any of the foregoing scenarios, it is necessary for the telephone set 100 to be capable of going off-hook before it can place or receive a call. Control over the on-hook/off-hook status of the set, together with control over the functions performed before and after the set is off-hook, are effected by the control electronics of the set, particularly the microprocessor 18. As long as these components are supplied with the requisite power, i.e., VCC, from the power supply 12 as above, this control can be effected normally. However, in the event of a power failure, control of the telephone becomes impossible, because the set cannot detect an incoming call, or an instruction either to answer an incoming call or to place an outgoing call, i.e., to go off-hook.

For this reason, enhanced-function telephone sets typically incorporate a backup power supply in the form of one or more batteries that temporarily supply power to the control electronics of the set in the event of a power outage, so that the telephone can at least receive or place voice calls during such outage. However, the use of batteries as a backup power supply presents a number of problems, including that they are large, expensive, incorporate hazardous materials, require relatively sophisticated re-charging circuitry, take a long time to recharge, are limited in the number of times that they can be recharged, and must be replaced periodically to ensure a reasonable degree of reliability.

An exemplary embodiment of a backup power supply 10 for a telephone set that does not use batteries, and which is therefore smaller, less inexpensive, safer for the environment, longer-lived, and more reliable than power supplies that do use batteries, is illustrated in the schematic diagram of FIG. 1. The novel backup power supply comprises a capacitor C1 having a first lead coupled to ground and a charge capacity that is sufficient to power the electronics of the telephone for the brief period of time necessary for the set to go off-hook and thereby draw sufficient power from the local service loop to at least place or receive voice calls. In the particular exemplary embodiment illustrated, the capacitor C1 comprises a 5.5 VDC, 1.8 Farad, electric, double-layer capacitor ("EDLC") of a type available from a number of manufacturers, including Panasonic and Power Systems Co. under such names as "Super Cap," "Maxi Cap," and "Ultra Cap." However, other types and brands of capacitors may also be used.

While, on a size basis, EDLCs lack the same storage capacity of rechargeable batteries, they nevertheless provide several advantages over the latter. For example, since rechargeable batteries usually contain heavy metals, they generally weigh substantially more that an equivalent EDLC, and can also present a pollution hazard, whereas, EDLCs do not. Further, since rechargeable batteries store energy by chemical reactions, they require much longer periods of time to recharge. For example, a lithium-ion battery may take several hours to recharge to a usable voltage level, whereas, an EDLC can be charged to between 60-84% of its rated capacity in from 30 to 60 seconds.

Further, rechargeable batteries can be recharged only a limited number of times, viz., between about 500-2000 times, before they lose their storage capacity and must therefore be replaced. EDLCs can be completely charged and discharged more than 10,000 times with no reduction in their energy storage capacity. Finally, the rate at which current is drawn from or applied to rechargeable batteries must be carefully controlled to prevent damaging them. EDLCs have no such current limitations. Thus, any charging current can be applied to an EDLC, provided that the charging voltage does not exceed the rated voltage of the capacitor, and when the EDLC is fully charged, the two terminals of the device can even be shorted together without damaging the device.

In addition to the EDLC C1, the backup power supply 10 also comprises circuitry, including a pair of electrically actuated, complementary metal oxide semiconductor ("CMOS") Hook and Hold switches SW1 and SW2, respectively, for selectably coupling the charge, and hence, the power stored in the capacitor C1 to the electronics of the telephone set 100, including the microprocessor 18, so that the telephone 100 can receive or place voice calls in the event of an outage of the conventional power supply 12, as well as circuitry for recharging the capacitor C1 rapidly, either from the conventional power supply, if functioning, or if not, from the local Telco or PBX service loop 30, in the manner described below.

As may be seen in FIG. 1, during normal operation, the components of the telephone 100, digital and analog, are supplied with 5 VDC ("VCC") from the power supply 12 through the power bus 16. Thus, the capacitor C1 is normally charged from the power supply, which is connected to the second lead of the capacitor through the diode D7, to a voltage level of 5 VDC, i.e., to VCC, the charge level being regulated by the breakdown voltage of the 5.1 V Zener diode D1, and this voltage is present at one of the terminals of the manually actuated hand set/push button switchhook 28.

Additionally, the tip-and-ring signal connections from the local loop 30 are respectively coupled, e.g., through a conventional RJ 11 telephone jack and plug connector 31, to two opposite terminals of a bridge rectifier 38. One of the other pair of the bridge terminals is grounded, and the fourth bridge terminal is connectable to ground through the electrically actuated CMOS switch SW1, e.g., a transistor, and a second voltage-regulating diode, a 5.1 V Zener diode D6. Thus, when the microprocessor 18 sends a "Hold" signal to the electrically actuated Hook switch SW1, the switch "closes," i.e., it conducts, causing the telephone 100 to go "off-hook" electronically, i.e., it couples the telephone to the local loop through ground, and simultaneously, couples the rectified signal of the local loop, regulated to a maximum of 5 VDC by D6, through the diode D5 to the second lead of the capacitor C1. Thus, even if the power supply 12 is not functioning, the capacitor C1 is quickly charged, or recharged, from the power of the local loop, whenever the telephone is off-hook.

As shown in FIG. 1, the fourth terminal of the bridge rectifier 38 is also coupled to a conventional ring detector 40, as described below, and to the backup power supply capacitor C1 through a relatively large, e.g., 10 Megohm, resistor R1, thereby "bypassing" the CMOS Hook switch SW1. Thus, it will be seen that the capacitor C1 is continuously coupled to the rectified voltage signal of the local loop 30 through R1 even when the telephone 100 is on-hook, and this coupling therefore also functions to charge the capacitor C1 continuously, even when the power supply 12 is not functioning and the telephone is on-hook, although at a substantially lower rate, as controlled by the resistor R1.

This lower charging rate is the result of an FCC regulation, which limits the amount of power that the telephone 100 can draw from the local loop 30 when it is on-hook, to 480 µW, i.e., 10 µA at 48 VDC. Accordingly, the resistor R1 is interposed in the charging circuit to limit the amount of current that the capacitor C1 can draw when the telephone is on-hook to such a reduced level. However, even though the rate at which the capacitor C1 continuously recharges from the local loop is substantially reduced when the telephone is on-hook, that rate is nevertheless much greater than the capacitor's long-term "leakage rate," i.e., the rate at which the capacitor loses charge over an extended period of time during which both a power outage exists and the telephone remains on-hook.

In operation, the backup power supply 10 of the invention functions to enable an outgoing call to be manually placed from the telephone set 100, or an incoming call to be manually received by it, in the follow manner, in which it is assumed that a power outage has occurred, and accordingly, that the control electronics of the telephone, including its microprocessor 18, are without power, i.e., "off." If the handset 26 is lifted from the telephone in this circumstance, or alternatively, if the manually actuated switchhook button 28 is depressed, the capacitor C1 begins to discharge through the switch 28, thereby charging a capacitor C3 and also, through a diode D4 and a resistor R2, a capacitor C2 coupled between a terminal of the CMOS Hold switch SW2 and ground. Simultaneously, the voltage on C1 is also applied to an input terminal of the microprocessor 18 in the form of a "Hook" signal, i.e., an instruction to the telephone to go off-hook.

When the voltage level on C2 reaches the level necessary to actuate the CMOS Hold switch SW2, the switch "closes," i.e., begins to conduct, thereby coupling the voltage on the backup power capacitor C1 to the power supply bus 16, whereupon the control electronics of the telephone 100, including the microprocessor 18, are powered "on." The microprocessor then detects the above Hook signal, and responsive thereto, sends a Hold signal via a Hold terminal thereof to the CMOS Hook switch SW1, as above. This causes SW1 to close and the telephone to go off-hook, thereby coupling the telephone to the local loop 30 so that a call can be placed or answered, and simultaneously, so that the capacitor C1 is recharged from the local loop, as described above. The Hold signal is also applied to C2 through the diode D2 and the resistor R2 to keep the electronic Hold switch SW2 closed, and hence, the backup power of the capacitor C1 coupled to the power supply bus of the system, after the switchhook button 28 is manually released, i.e., allowed to open.

To enable the telephone 100 to detect and automatically answer an incoming call without local human intervention, the backup power supply 10 is coupled to the output of a conventional ring detector 40, as illustrated in FIG. 1. During normal operation, the Telco applies a 90 VAC ring signal through the local loop 30 to the tip and ring terminals of the telephone. This signal is rectified by the bridge rectifier 38 and applied to the ring detector, which optionally produces an audible ring signal to notify a local human user of an incoming call, as well as a "Ring Detect" signal to notify the microprocessor 18 thereof. A human user can then answer, or receive the call, by manually actuating the switchhook 28, even if the electronics of the set are not powered up, in the manner described above.

However, in a power outage, the microprocessor 18 is inactive, and therefore can neither detect the Ring Detect signal nor, even if programmed to do so, automatically go off-hook to answer the incoming call, e.g., to receive data or programming instructions via an incoming call. To overcome this problem, the Ring Detect signal of the ring detector 40 is also coupled to C2 of the backup power supply 10 through the diode D3 and the resistor R2. When the voltage on C2 produced thereby reaches the level necessary to actuate the CMOS Hold switch SW2, the backup power of the capacitor C1 is then coupled to the power bus 16, as above, thereby powering up the control electronics of the telephone 100. The microprocessor 18 can then sense the Ring Detect signal, and if programmed to do so, send a Hold signal to the CMOS Hold switch SW1, as described above, causing the telephone to go off-hook and coupling it to the local loop 30 so that the call can be answered, and simultaneously, so that recharging of the capacitor C1 from the local loop can begin, as described above.

By now those of skill in the art will recognize that the telephone set 100, when provided with the backup power supply 10 of the present invention, is capable of continuous operation, even without a conventional external power supply. Further, many modifications and substitutions are possible in terms of the components, circuitry and techniques of the backup power supply 10 of the present invention without departing from its spirit and scope. For example, while CMOS switches, because of their inherent lower power requirements, have been described in the context of the particular exemplary embodiment presented, other types of switches are widely available and can be used in their place. Additionally, it will be appreciated that it is possible to replace substantially all of the discrete components of the backup power supply described with an application-specific integrated circuit ("ASIC") microprocessor capable of operating in a very-low-power "standby" or "sleep" mode. Other such modifications will also suggest themselves to those of skill in the art in light of the disclosures contained herein.

In light of the foregoing, the scope of present invention should not be limited to that of the particular embodiments described and illustrated herein, as these are merely exemplary in nature. Rather the scope of the present invention should be fully commensurate with the claims appended hereafter and their functional equivalents.

What is claimed is:

1. A battery-less backup power supply for a telephone of a type that incorporates control electronics requiring an external source of power greater than that available from the local loop of a Telco or PBX when the telephone is on-hook, comprising:
    a capacitor having a first lead coupled to ground;
    a circuit for charging the capacitor from at least one of the external power source and the local loop; and,
    a circuit for coupling the charge of the capacitor to the control electronics of the telephone when the external power source is not functioning.

2. The backup power supply of claim 1, wherein the capacitor comprises an Electric Double Layer Capacitor ("EDLC").

3. The backup power supply of claim 1, wherein the charging circuit comprises:
    a first diode having a first lead coupled to ground; and,
    an electrical connection between the external power source and a second lead of the first diode and a second lead of the capacitor,
    whereby the capacitor is charged to the lesser of the breakdown voltage of the first diode and the voltage of the external power source when the external power supply is functioning.

4. The backup power supply of claim 3, wherein the charging circuit further comprises:
    a bridge rectifier having opposite first and second terminals coupled to the tip and ring signals of the local loop, a third terminal coupled to ground, and a fourth terminal having an output voltage connected through a resistor to the second lead of the first diode and the second lead of the capacitor,
    whereby the capacitor is charged to the lesser of the output voltage of the resistor and the breakdown voltage of the first diode when the external power source is not functioning and the telephone is on-hook.

5. The backup power supply of claim 4, wherein the charging circuit further comprises:
    the telephone control electronics having a microprocessor operable to output a Hold signal in response to a receipt thereby of a Hook signal that instructs the telephone to go off-hook;
    a second diode having a first lead coupled to ground; and
    an electrically actuated hook switch comprising:
        a first terminal coupled to the fourth terminal of the bridge rectifier;
        a second terminal coupled to a second lead of the first, second lead of the second diode and the second lead of the capacitor; and
        a third terminal operable to couple the voltage of the fourth terminal of the bridge rectifier to the second terminal of the hook switch in response to a receipt thereby of the Hold signal from the microprocessor,
        whereby the capacitor is charged to the lesser of the voltage of the fourth terminal of the rectifier bridge and the breakdown voltage of the second diode when the external power source is not functioning and the telephone is off-hook.

6. The backup power supply of claim 5, wherein the circuit for coupling the charge of the capacitor to the control electronics of the telephone comprises:
    an electrically actuated hold switch having:
        a first terminal coupled to the second lead of the capacitor;
        a second terminal coupled to a power supply bus of the microprocessor; and,
        a third terminal coupled to ground and a Hold signal output terminal of the microprocessor and operable to couple the voltage of the second lead of the capacitor to the power supply bus of the microprocessor in response to a receipt thereby of the Hold signal; and,
    a manually actuated switchhook operable to couple the voltage of the second lead of the capacitor to a Hook signal input terminal of the microprocessor and the third terminal of the hold switch when actuated,
    whereby the telephone can be manually instructed to go off-hook for placing or receiving a call when the external power source is not functioning.

7. The backup power supply of claim 6, wherein the circuit for coupling the charge of the capacitor to the control electronics of the telephone further comprises:
    a ring detector coupled to the fourth terminal of the bridge rectifier and operable upon detection of a ring signal thereon to apply a Ring Detect signal to a Ring Detect signal input terminal of the microprocessor and to couple the voltage of the fourth terminal of the bridge rectifier to the third terminal of the Hold switch,
    whereby the telephone can be programmed to automatically go off-hook for receiving a call without local human participation and when the external power source is not functioning.

8. The backup power supply of claim 7, wherein the microprocessor is programmable to actuate one or more relays in response to instructions received via an incoming call.

9. The backup power supply of claim 7, wherein the microprocessor is programmable to receive and store data or programming instructions received via an incoming call.

10. The backup power supply of claim 5, wherein at least one of the first and second diodes comprises a Zener diode.

11. The backup power supply of claim 6, wherein at least one of the electrically actuated hook and hold switches comprises a CMOS switch.

12. The backup power supply of claim 11, wherein at least one of the electronically actuated hook and hold switches comprises a CMOS switch.

13. A battery-less backup power supply for a telephone of a type that incorporates control electronics requiring an external source of power greater than that available from the service loop of a Telco or PBX when the telephone is on-hook, comprising:
  a capacitor having a first lead coupled to ground;
  a first diode having a first lead coupled to ground;
  an electrical connection between the external power source and a second lead of the first diode and a second lead of the capacitor;
  a bridge rectifier having opposite first and second terminals coupled to the tip and ring signals of the local loop, a third terminal coupled to ground, and a fourth terminal having an output voltage connected through a resistor to the second lead of the first diode and the second lead of the capacitor;
  a microprocessor operable to output a Hold signal in response to a receipt thereby of a Hook signal that instructs the telephone to go off-hook;
  a second diode having a first lead connected to ground;
  an electrically actuated hook switch having a first terminal coupled to the fourth terminal of the bridge rectifier, a second terminal coupled to a second lead of the first diode and the second lead of the capacitor, and a third terminal operable to couple the voltage of the fourth terminal of the bridge rectifier to the second terminal of the hook switch in response to a receipt thereby of the Hold signal from the microprocessor;
  an electrically actuated hold switch having a first terminal coupled to the second lead of the capacitor, a second terminal coupled to a power supply bus of the microprocessor, and a third terminal coupled to ground and a Hold signal output terminal of the microprocessor, and operable to couple the voltage of the second lead of the capacitor to the power supply bus of the microprocessor in response to a receipt thereby of the Hold signal;
  a manually actuated switchhook operable to couple the voltage of the second lead of the capacitor to a Hook signal input terminal of the microprocessor and the third terminal of the hold switch when actuated; and,
  a ring detector coupled to the fourth terminal of the bridge rectifier and operable upon detection of a ring signal thereon to apply a Ring Detect signal to a Ring Detect signal input terminal of the microprocessor and to couple the voltage of the fourth terminal of the bridge rectifier to the third terminal of the Hold switch.

14. The backup power supply of claim 13, wherein the capacitor comprises an Electric Double Layer Capacitor ("EDLC").

15. The backup power supply of claim 13, wherein the microprocessor is programmable to actuate one or more relays in response to instructions received via an incoming call.

16. The backup power supply of claim 13, wherein the microprocessor is programmable to receive and store data or programming instructions received via an incoming call.

17. The backup power supply of claim 13, wherein at least one of the first and second diodes comprises a Zener diode.

18. A method for providing backup power to a telephone of a type that incorporates control electronics requiring an external source of power greater than that available from the service loop of a Telco or PBX when the telephone is on-hook without using batteries, the method comprising:
  providing a battery-less backup power supply in accordance with claim 1 in the telephone;
  charging the capacitor of the backup power supply from at least one of the external power source and the local loop; and,
  coupling the charge of the capacitor to the control electronics of the telephone when the external power source is not functioning such that the telephone is capable of at least placing and receiving calls.

19. The method of claim 18, wherein charging the capacitor comprises charging the capacitor from the local loop when the external power source is not functioning and the telephone is off-hook.

20. The method of claim 18, wherein charging the capacitor comprises charging the capacitor from the local loop when the external power source is not functioning and the telephone is on-hook.

* * * * *